Feb. 20, 1945.   H. A. DOUGLAS   2,369,820
AIRPLANE
Original Filed Nov. 6, 1940   3 Sheets-Sheet 1
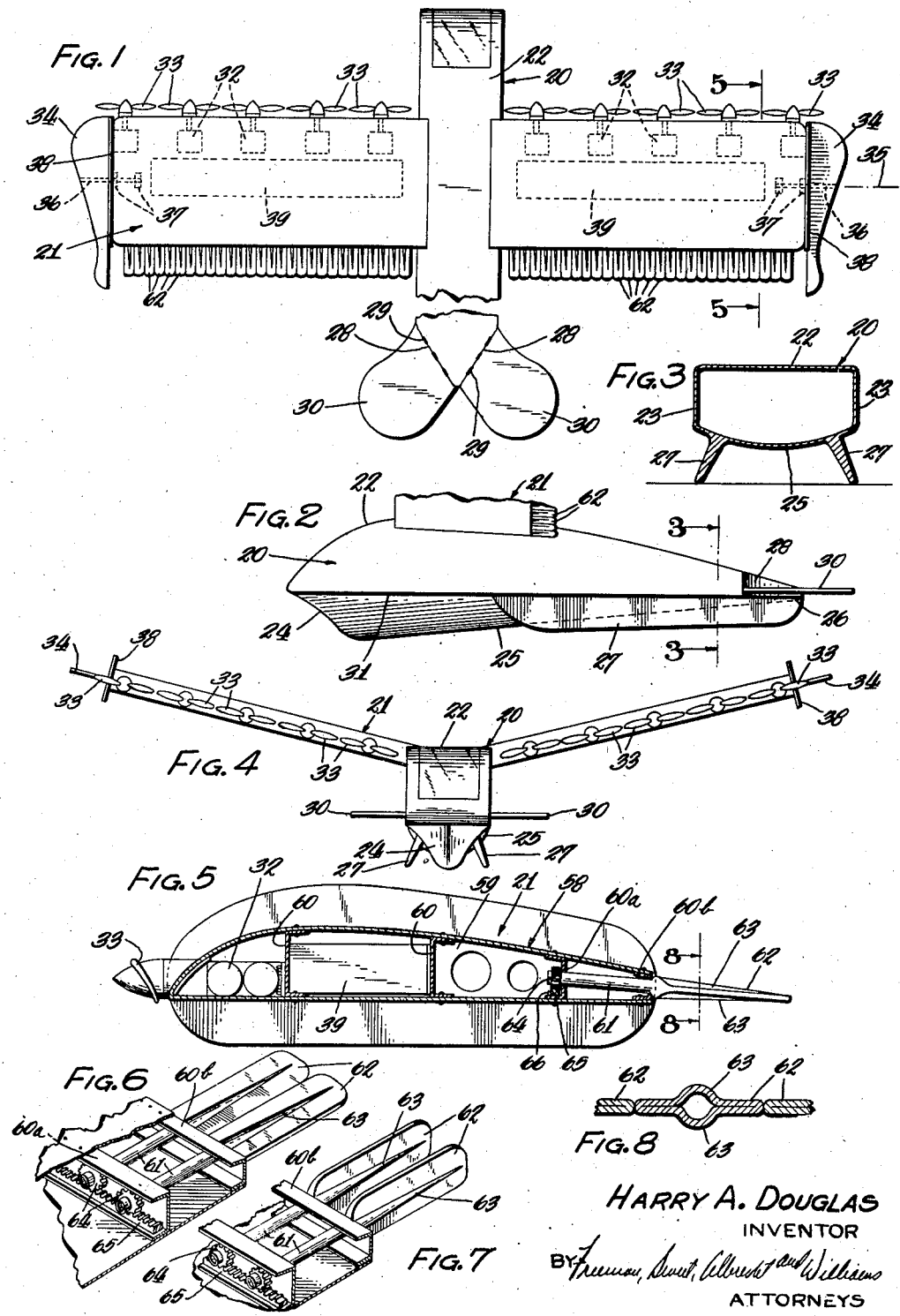
HARRY A. DOUGLAS
INVENTOR
ATTORNEYS Feb. 20, 1945.  H. A. DOUGLAS  2,369,820
AIRPLANE
Original Filed Nov. 6, 1940   3 Sheets-Sheet 2
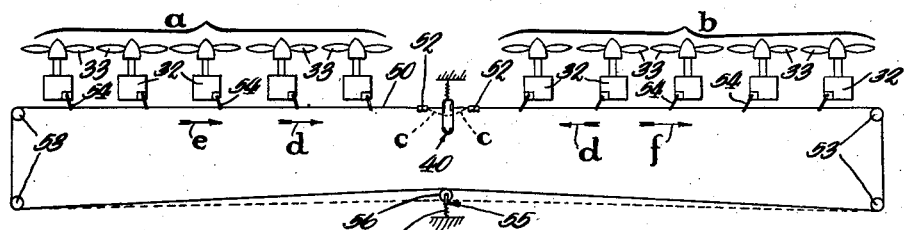
Fig. 9
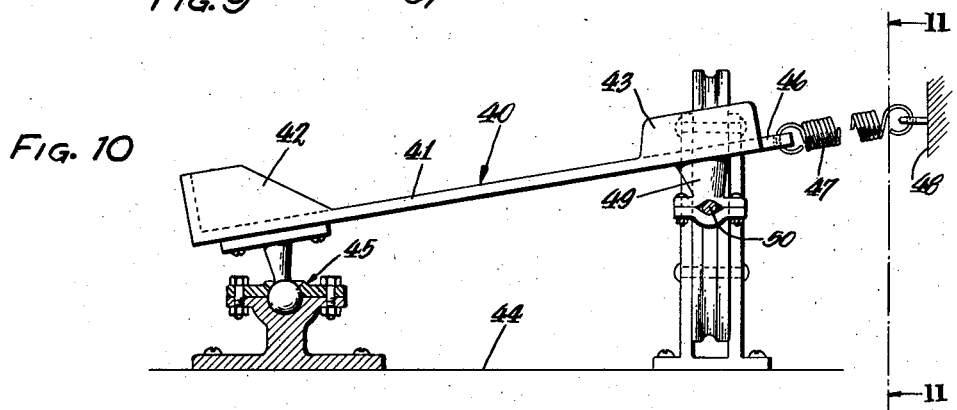
Fig. 10
Fig. 11
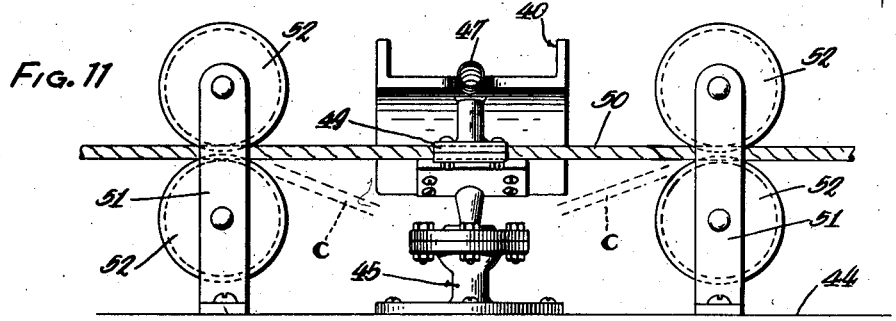
Fig. 12
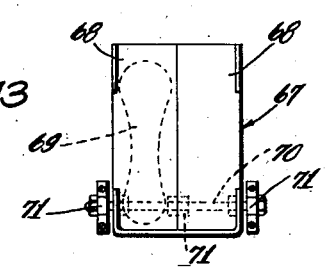
Fig. 13
HARRY A. DOUGLAS
INVENTOR
BY
ATTORNEYS Feb. 20, 1945. H. A. DOUGLAS 2,369,820
AIRPLANE
Original Filed Nov. 6, 1940 3 Sheets-Sheet 3
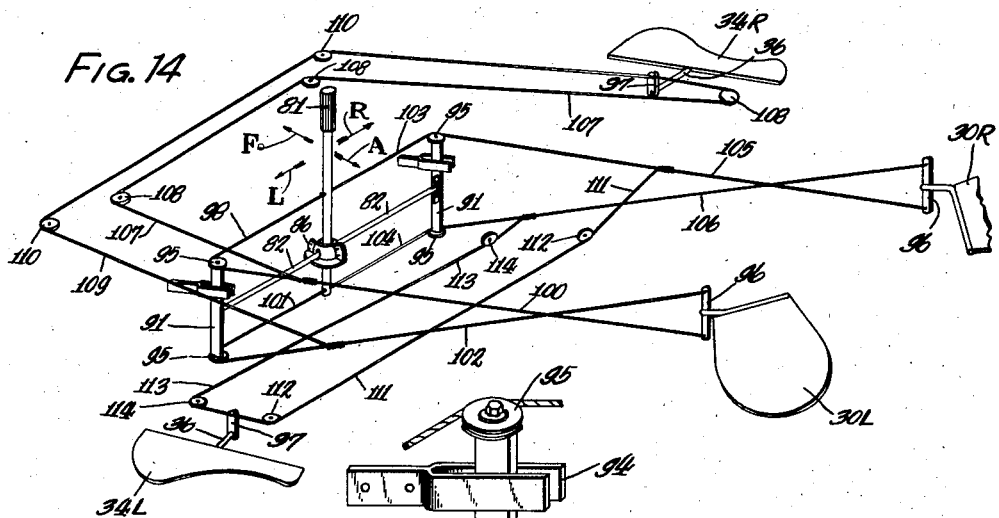
Harry A. Douglas
INVENTOR
ATTORNEYS Patented Feb. 20, 1945

2,369,820

UNITED STATES PATENT OFFICE 2,369,820

AIRPLANE

Harry A. Douglas, Bronson, Mich.

Original application November 6, 1940, Serial No. 364,520. Divided and this application March 24, 1944, Serial No. 527,919

7 Claims. (Cl. 244—87)

This invention relates to airplanes, and particularly to such design and construction that will improve the safeness, maneuverability, and practicability of airplanes. The principal object of the invention is to provide new and improved airplanes and airplane constructions, having the aforementioned qualities. This application is a division of my application Serial Number 364,520, filed November 6, 1940.

In the drawings accompanying this specification, and forming a part of this application, I have shown, for purposes of illustration, an embodiment which my invention may assume, and in these drawings:

Figure 1 is a broken plan view of an embodiment disclosing my invention,

Figure 2 is a broken side elevational view of the embodiment shown in Figure 1,

Figure 3 is an enlarged transverse sectional view corresponding generally to the line 3—3 of Figure 2, Figure 4 is a front view of the embodiment shown in Figure 1, Figure 5 is an enlarged sectional view corresponding generally to the line 5—5 of Figure 1.

Figure 6 is a fragmentary perspective view of a detail, showing parts in one position, Figure 7 is a fragmentary perspective view similar to Figure 6, but showing the parts in another position, Figure 8 is an enlarged sectional view corresponding generally to the line 8—8 of Figure 5, Figure 9 is generally a diagrammatic view showing the means for controlling the airplane motors, Figure 10 is an enlarged detail view of a part used in the motor control shown in Figure 9, Figure 11 is a view corresponding generally to the line 11—11 of Figure 10, Figure 12 is generally a diagrammatic view showing the means for controlling the parts shown in Figures 6 and 7, Figure 13 is an enlarged detail view of a part used in the control means shown in Figure 12, Figure 14 is a generally diagrammatic view showing the control means for the ailerons and rear elevator surfaces, Figure 15 is an enlarged perspective view of a portion of the construction used in the control means shown in Figure 14, and Figure 16 is an enlarged detail of another portion of the construction used in the control means shown in Figure 14.

Referring particularly to Figures 1 through 4, the airplane herein shown to disclose the invention comprises a fuselage 20, and a wing 21 connected to the fuselage. The airplane herein shown is of the monoplane type, but it is to be understood that the invention is equally applicable to airplanes of other types. As shown in Figures 1 and 4, the wing may comprise portions extending from either side of the fuselage 20, and these wing portions may, if desired, be so positioned as to form a dihedral angle with respect to each other, as shown in Figure 4.

The fuselage 20 is formed with an upper curved surface 22, similar to the accepted contour of a wing section, and the sides 23 of the fuselage are generally flat and parallel with respect to each other. The under surface of the fuselage is formed to assume a keel-like shape, having a generally V-shaped prow 24, and a rounded bottom 25 tapering to a generally flat portion 26 at the rear of the fuselage.

Extending from the rear of the fuselage to a point short of the prow 25, is a pair of spaced-apart skid runners 27, which project downwardly, in diverging relation as best shown in Figure 3, from the bottom of the fuselage an amount sufficient so that the lower surface of each skid runner may slidably engage the ground surface of a landing area. In alighting on such landing area, the operator brings the tail of the airplane in contact with the ground first, so that the airplane may substantially skid to a stop before the forward part of the airplane engages the ground. When alighting, the operator speeds up the airplane motors, the skid runners 27 providing sufficient drag so that the forward part of the airplane will be lifted first before the fuselage moves any appreciable distance along the ground. From the foregoing, it will be evident that an airplane having a fuselage of the kind described may arise from and alight on either land or water. Because of the particular contour of the fuselage, especially the upper surface 22, an air stream flowing generally longitudinally along the fuselage will produce a reduced air pressure at the upper surface 22 of the fuselage, and thereby provide a force tending to lift the fuselage upwardly. Further, the skid runners, because of their particular construction and arrangement, will act as stabilizing means, both when the airplane is in flight or when it is in the water, since such runners are in a position to engage either the air or the water and to prevent tipping as well as side slip of the airplane.

As best shown in Figures 1 and 2, the sides 23, at the rear of the fuselage, have angular portions 28 converging with respect to each other, and to these angular portions 28 are pivotally connected, as at 29, the rear elevator surfaces 30, the connections being such that one surface 30 may move independently of the other. Referring to Figure 2, and assuming that the fuselage 20 is in the water substantially to the water line 31, it will be clear that if one or the other of the surfaces 30 is pivoted downwardly, such surface will engage the water, and steer the airplane in its movement through the water. Also, if both of the surfaces 30 are in a downward position, such surfaces will engage the water and act as a brake. Thus, it will be clear that the elevator surfaces not only assist in control of the airplane when in flight, but also serve to control movement of the airplane when the fuselage is in water.

The airplane is here shown as being of the multi-motor type, and preferably I employ a plurality of motors 32 along each wing portion. It is desirable, although not essential, to use motors of a relatively low horsepower, such as for example 85 horsepower, so that these motors can be made small in size to fit entirely within the wing. In the embodiment disclosed, I have shown five motors within each portion of the wing, the motor shafts extending forwardly of the leading edge of the wing, and each carrying a propeller 33. Each of the propellers is preferably of such blade length that a blade at its upper position does not greatly extend beyond the upper part of the materially disturbed air above the airplane wing. As shown best in Figure 1, the motors 32 are so arranged, and the propellers 33 are of such size, that the propellers are arranged tip to tip; that is, when the propellers are rotating, they just miss each other.

The propellers at the transverse margins of the wing 21 extend beyond such margins, so as to be in such position that at least part of the air stream of each of the outermost propellers flows directly across an aileron 34. As best shown in Figure 1, each aileron extends from a respective transverse margin of the wing 21, and is positioned directly in the rear of the adjacent outermost propeller 33. Each aileron 34 is pivotable about an axis 35 generally parallel to the longitudinal axis of the airplane wing 21, and each aileron is preferably so designed that the portions on either side of the turning axis 35 provide substantially equal turning moments. As shown in Figure 1, the axis 35 may be provided in the form of a shaft 36 journaled in bearings 37 carried by the airplane wing. Disposed between each aileron 34 and its respective transverse wing margin is a generally flat plate 38, preferably of sheet-metal, and of such size as to extend a sufficient distance from the upper and lower surfaces of the wing as to generally divide the air stream from the adjacent outermost propeller into stream portions respectively confined to flow over the adjacent aileron 34 and the adjacent part of the wing. In view of the foregoing description, it will be clear that each of the ailerons 34 is directly in at least a portion of the air stream produced by its adjacent outermost propeller, so that control of the airplane is possible through the use of the ailerons 34, even under conditions such as when the airplane encounters an air pocket. Each of the plates 38 prevents a loss of lifting power by confining air flow transversely of the wing and preventing slippage of air flow from the ends of the wing.

As before pointed out, each of the motors is preferably of such size as to fit entirely within a wing, a comfortable space being left within the wing to provide for gas tanks 39 immediately in rear of the motors. In the use of multi-motor airplanes, one of the problems largely encountered is the necessity of accurately controlling operation of all of the motors. Referring particularly to Figures 9 through 11, there is shown a control for the motors which is economical in manufacture and assembly, yet efficient and accurate in operation. For purposes of description, the motors and their propellers on respective wing portions have been bracketed into sets $a$ and $b$.

The control system herein shown comprises a foot pedal 40, having a foot plate 41, a heel cup 42 to receive the heel of the operator's shoe, and upwardly bent side portions 43 to engage the sides of the operator's shoe. The foot pedal 40 is supported from a supporting surface 44, which may be the floor of the fuselage adjacent the operator's seat, by means of a ball and socket joint 45, so that the foot pedal may be moved toward or away from the surface 44, or generally in a plane parallel to such supporting surface. The plate 41 of the foot pedal 40 is provided with an ear 46 receiving one end of a coil spring 47, the other end of the spring being connected to a support 48, which may be part of the fuselage. The spring 47 not only yieldably holds the foot pedal 40 in its upper position, as shown in Figure 10, but also yieldably holds the foot pedal 40 in an intermediate position, as shown in Figure 11, with respect to its movement generally parallel to the supporting surface 44.

Projecting from the underside of the foot pedal 40 is a clamp arrangement 49, which clamps between its jaws a flexible connection means, which may be in the form of a flexible cable 50, so that any movement of the foot pedal 40 causes corresponding movement of the cable 50. On opposite sides of the foot pedal 40, and supported from the supporting surface 44, are pulley brackets 51, each carrying a pair of pulleys 52, spaced to accommodate the cable 50 therebetween.

Referring particularly to Figure 9, it will be seen that the cable 50 is in the form of a closed loop, and extends a material distance beyond the pulleys 52 and over and around pulleys 53. Also, the cable 50 has connection with the speed control device of each engine, such as the throttle control 54 of the carburetor of each engine. Each of the throttle controls 54 may be in the form of a pivoted lever, spring pressed to a central position, and movable to positions on either side of the central position. The central position, in this case, would be idling position for the respective motor, and movement to one side of central position would increase the speed of the motor, whereas movement to the other side would not disturb the motor from its idling speed. Each of the throttle controls 54 is so arranged in Figure 9 that when it is moved in a direction toward the foot pedal 40, it progressively increases the speed of its motor. A take-up device 55 is provided to maintain the cable 50 in proper tensioned relation, and comprises a pulley 56 pressed in the proper direction by a spring 57 so as to maintain the cable taut.

From the foregoing description, it will be clear that when the airplane operator presses downwardly on the foot pedal 40, that part of the cable 50 which is clamped to the foot pedal will also be depressed, as suggested by the dotted lines c in Figures 9 and 11, those portions of the cable on opposite sides of the foot pedal being pulled inwardly, in a direction shown by the arrows marked d in Figure 9, thus causing movement of all of the throttle levers 54 in a direction to increase the speed of all the motors. The take-up device 55 of course will yield sufficiently to permit such movement of the cable 50.

On the other hand, should the operator shift the foot pedal 40 to the right as viewed in Figure 9, the left hand portion of the cable 50 will move in the direction indicated by the letter e, whereas the right hand portion of the cable will move in the direction indicated by the letter f, and the entire cable will merely rotate about the pulleys 53 and 56 without affecting the take-up device 55. Under these conditions the motors in the set a will be accelerated, whereas the motors in the set b will still remain in idling operation. Of course, shifting of the foot pedal 40 to the left, as viewed in Figure 9, will accelerate the set of motors indicated by the bracket b, but will not affect idling operation of the set of motors indicated by the bracket a. Additionally, all the motors may be accelerated a certain degree by pressing downwardly a predetermined amount on the foot pedal 40, and then the foot pedal may be shifted to further accelerate one set of motors and simultaneously decelerate the other set of motors. It will be appreciated that because of the accurate control over the motors made possible by my invention, the airplane can be readily turned, either on land or water, or when in flight, by accelerating one of the sets of motors. Also, flight of the airplane is made more stable, since the operator can instantly compensate, by proper control of the motors, for any difference in conditions on either side of the airplane.

My invention also contemplates the use of a "feathering apparatus" adjacent the trailing edge of the wing 21. In the embodiment herein shown, such "feathering apparatus" takes the form of a plurality of vanes, each being wider than it is thick, and the vanes being so constructed and arranged that in a closed position they are in side edge to edge relation to form a generally unbroken surface at the trailing edge of the wing, and in an open position they are in face to face relation to open the swing surface at the trailing edge of the wing. In practice, each of the vanes may be formed from a sheet metal tube that has one end drawn to an enlarged diameter and then flattened to form the vane proper.

Referring particularly to Figures 5 through 8, the wing 21 comprises a body 58 which may be formed in the usual manner; that is, by connecting transverse ribs 59 to longitudinally extending channels 60. The rearmost channels 60a, 60b, in the embodiment herein shown, provide journals for the tubular portion 61 of the vanes, the vane proper 62 being generally flat and wider than it is thick, and being provided with ribs 63 extending laterally from the flat surfaces. Each rib preferably has its greatest size adjacent the tubular portion 61 and tapers to practically nothing adjacent the free extremity of the vane proper 62.

Inwardly of the channel 60a, each tubular portion 61 has secured thereto a gear 64, adapted to mesh with a rack arrangement which in this embodiment comprises rack sections 65 which slide along the foot of the channel and may be held in operative position by projections 66, or in any other suitable manner. It will be obvious that longitudinal movement of the rack arrangement 65 will effect rotation of the gears 64, and thus effect opening and closing of the vanes. Heretofore, in wings of the ordinary construction, it has been found that air flowing along the upper and lower surfaces of the airplane wing, and meeting at the trailing edge of the airplane wing causes a violent eddy disturbance at this trailing edge, and this disturbance boils along the upper surface of the wing and interferes with the formation of a low pressure area at such upper surface, thus decreasing the lifting power of the wing. However, with the vanes in open position, air flowing along the top and bottom surfaces of the wing may mix without producing such eddy currents, since such mixing occurs substantially ahead of the eddy point of the wing. My invention further contemplates operating the vanes along one wing portion either simultaneously or independently with respect to the vanes along the other wing portion, thus effecting differential air pressures at such wing portions. By proper control of the vanes, the operator can prevent tipping or dipping of the wing portions, and thus increase stability of the airplane. Furthermore, because of the differential pressures which may be obtained by proper movement of the vanes on either side of the wing, such vanes may be used for effecting banking movements of the airplane.

Referring particularly to Figures 12 and 13, control means is shown for effectuating the desired operation of the vanes. The control means comprises a foot pedal 67, here shown as being formed in halves 68, each half being wide enough to comfortably accommodate the foot or footwear of an operator, as shown in the dotted lines by the numeral 69. Each of the halves 68 is pivoted about a shaft 70 carried by brackets 71 which are supported from a surface, and such surface may be the supporting surface 44. A pulley bracket 72, carrying pulleys 73, similar to the pulley bracket 51 and pulleys 52, hereinbefore described, is positioned on either side of the foot pedal 67, and a flexible connection is provided to connect the foot pedal with the rack arrangement for operating the vanes.

As here shown, the flexible connection comprises cable portions 74 and 75, respectively connected to the foot pedal halves 68, and further respectively connected to the rack sections, which for purposes of disclosure are numbered 65a and 65b in Figure 12, and each rack section engages all the gears carried by the vanes on the respective side of the wing 21. The cable portions 74 and 75 pass over fixedly positioned pulleys 76 and connect to one end of respective racks 65a, 65b, the other end of each of the racks being connected to a cable 77, each cable 77 in turn passing over fixedly positioned pulleys 78 and being connected to a fixed support 79, a spring 80 being interposed in each of such latter connections. From the foregoing, and assuming that the springs 80 exert a pull on the cables 77 to bias the vanes to closed position, should the operator position his foot to extend over both foot pedal halves 68, and then depress such halves together, the cable portions 74 and 75 will be moved in the direction of the arrows shown in Figure 12, by reason of the downward pull on those parts of the cable portions disposed intermediate the pulley brackets 72, in much the same manner as that described in the construction shown in Figures 9 through 11. Movement of the cable portions 74 and 75, in the direction of the arrows in Figure 12 causes shifting of each of the rack portions 65a and 65b to simultaneously open the vanes. On the other hand, should the operator depress only one half 68 of the foot pedal 67, only that cable portion connected to that half 68 will be effected, so that only the vanes actuated by that portion of the cable will be opened, the vanes at the other wing portion remaining closed. Thus, it will be seen that the operator, at will, can open the vanes at either side of the wing, or can open these vanes simultaneously.

Control means are also provided for effecting control of the ailerons and rear elevator surfaces, and as best shown in Figures 14 through 16, a control stick 81 is provided, positioned so as to be within easy reach of the operator. The control stick is so mounted that it may pivot about axes which are transverse to each other.

Extending from the opposite sides of the control stick 81, and intermediate its extremities, is a pair of rod projections 82, fixedly secured to opposite sides of the control stick 81. Adjacent the control stick 81, each of the rod projections 82 is formed with an enlarged portion 83, providing arcuate shoulders 84 with the remainder of the rod projection, the surfaces of the shoulders 84 being concentric with respect to the center point 85 on the control stick 81. The control stick 81 and its rod projections 82 are carried by a split housing 86 having diametrically opposite slots 87, each formed with an enlargement 88 to receive the enlarged portion 83 of the respective rod projection 82. The slots 87 and 88 closely but slidably accommodate the adjacent portions of the rod 82 and enlarged portion 83, and the shoulders 84 slidably engage with respective slot surfaces between each slot 87 and its enlargement 88, to guide movement of the control stick 81 in its movement transverse with respect to the axis of the rod projections 82. Thus it will be seen that the control stick may be shifted to the right or left, as shown by the arrows designated L and R in Figure 14, and may also be shifted forward and aft, as designated by the arrows F and A in Figure 14.

For purposes of identification in connection with the control means now being described, the ailerons 34 and elevator surfaces 30 each bear a proper suffix to designate which side of the airplane they are on. For instance, the elevator surface 30 and aileron 34 on the left hand side of the airplane are lettered 30L and 34R respectively, whereas the elevator surface and aileron on the right hand side of the airplane are lettered 30R and 34R respectively.

Each of the rod extensions 82 has a bi-furcated end 89, the furcations receiving therebetween a plate 90 fixedly carried by each of the pulley-carrying members 91, the plates 90 being preferably positioned at the mid-point of its respective member 91. Each plate 90 is formed with an arcuate slot 92, concentric with respect to the center 85 of the control stick 81, and a pin 93 extends through the furcations of the rod and is slidably received within a respective arcuate slot 92. Forks 94 are fixedly carried by a suitable portion of the airplane fuselage, and are so positioned that when the control stick is moved in the direction indicated by the arrows A or F, the rod projections 82 may cause rotational movement of the members 91, but when the control stick 81 is moved in the direction indicated by the arrows L or R, the forks 94 will prevent tilting movement of the members 91, and the pins 93 will ride in the arcuate slots 92 to permit relative motion of the rod projections 82 with respect to respective members 91.

Each of the members 91 carries pulleys 95 at its extremities, the pulleys preferably being spaced equi-distant from the rod projection 82, when such rod projection is in its intermediate position as shown in Figure 16.

The pivot of each elevator surface 30 includes a lever 96 extending above and below the pivot point, and operable to effect movement of the respective elevator surface. The pivot shaft 36 of each aileron 34 has secured thereto a lever 97, extending upwardly with respect to the pivot point, and operable to effect movement of the respective aileron.

Connecting means are provided for effecting connection of the elevator surfaces and the ailerons for the purpose of properly shifting these ailerons when the airplane is to rise or alight, or is to bank to the left or the right. As here shown, this connecting means comprises a flexible cable 98 connected to the control stick 81, on the upper side of the pivot defined by the rod projections 82. The cable 98 passes around the top pulley 95 carried by the left hand member 91, as viewed in Figure 14, and has a portion 100 extending and connected to the lower end of the lever 96 of the pivot of the elevator surface 30L. A cable 101 is connected to the control stick below the pivot defined by the rod projections 82, preferably being spaced from such pivot an amount equal to the spacing of the cable 98. The cable 101 passes around the bottom pulley 95 carried by the member 91 which is positioned to the left of the control stick, as viewed in Figure 14, and has a portion 102 extending and connected to the upper end of the lever 96 of the elevator surface 30L.

In like manner, cables 103 and 104 are connected to the control stick 81, and respectively pass around top and bottom pulleys 95 on the member 91 disposed to the right of the control stick, as viewed in Figure 14, these cables having portions 105 and 106 respectively, connected to the lower and upper ends of the lever 96 which operates the elevator surface 30R. Connected to the cable portion 100 is a cable 107, passing around fixedly positioned pulleys 108, and being secured from the rear to the lever 97 which actuates the aileron 34R. Also, secured to the cable portion 102 is a cable 109, passing around fixedly positioned pulleys 110, and being secured, from the front, to the lever 97 of the aileron 34R. In like manner, the cable portion 105 has a cable 111 connected thereto, the latter cable passing around fixedly positioned pulleys 112 and secured, from the rear, the lever 97 which operates the aileron 34L, and the cable portion 106 has a cable 113 secured thereto, this cable passing around fixedly positioned pulleys 114, and being secured, from the front, to the lever 97 which actuates the aileron 34L.

In view of the foregoing description, and assuming that the elevator surfaces and ailerons are in horizontal position and the control stick 81 is in upright position, should the operator decide to cause the plane to rise, he pulls back on the control stick 81 in the direction shown by the arrow A in Figure 14. This causes rotation of the rod projections 82 and rotation of the pulley-carrying members 91, and exerts a pull on the cable portions 102 and 106, causing the levers 96 to shift the rear elevator surfaces 30L and 30R upwardly, and such movement of the levers 96 effects a pull on the cable portions 100 and 105, moving such cable portions in a direction opposite to the direction of movement of the cable portions 102 and 106, thus effecting respective movement of the cables 107 and 111 which in turn cause the ailerons 34R and 34L to pivot in such direction that the forward part of each aileron is raised and the rearward part is depressed. The cables 109 and 113 move an amount corresponding to the amount moved by the cables 107 and 111, thus maintaining the ailerons in fixed relation in their adjusted positions. If the operator desires to descend, he shifts the control stick 81 forwardly in the direction shown by the arrow F in Figure 14, and an opposite movement of the cable connections will cause the rear surface elevators to move downwardly, and likewise cause the ailerons to shift so that the forward portion of each aileron is moved downwardly and the rearward portion is moved upwardly.

In the event that the operator decides to bank the airplane to the left, he shifts the control stick 81 to the left, as shown by the arrow L in Figure 14. This shifting movement causes a tilting action of the rod projections 82, but does not effect movement of the pulley-supporting members 81, by reason of the pin and slot connection 93—992, and by reason of the forks 94. Under these conditions, a pull will be exerted on the cable 103, and this pull will cause the cable to move about its respective pulley 95, the pull being transmitted to the cable portion 105, causing pivotal movement of the lever 96 in such direction as to swing the elevator surface 30R downwardly, and such movement by the lever 96 exerts a pull on the cable portion 106, and causes the cable 104 to move about its respective pulley 95. Likewise, a pull is effected upon the cable 101, causing it to move about its respective pulley 95, such pull being transmitted to the cable portion 102, and causes pivoting movement of the lever 96 in such direction that the elevator surface 30L will be moved upwardly. Such movement of the lever 96 exerts a pull on the cable portion 100, and causes the cable 98 to move about its respective pulley 95. Simultaneously, the pull on the cable portion 100 will cause a pull on the cable 107, so that this cable will move about its pulleys 108, and shift the lever 97 of the aileron 34R in such manner that the forward part of the aileron 34R will be moved upwardly and its rearward part will be moved downwardly. Also, the pull on the cable portion 106 will effect a pull on the cable 113, causing this latter cable to shift the lever 97 of the aileron 34L, so that the forward portion of this aileron will move downwardly, and the rearward portion will move upwardly.

To effect banking movement to the right, the control stick 81 is moved to the right, as shown by the arrow R in Figure 14, and a reverse movement of the cables will cause the elevator surface 30R to move upwardly and the elevator surface 30L to move downwardly, and simultaneously cause the aileron 34R to shift so that its forward portion will move downwardly and its rearward portion will move upwardly, and further shift the aileron 34L so that its forward portion will move upwardly and its rearward portion will move downwardly.

It will be apparent that a forward or aft movement of the control stick may be combined with either a left or right movement, to combine rise or descent of the airplane with a bank in either direction. In the event the operator desires to sharply turn the airplane, either when it is on land or water, or when it is in flight, he can additionally speed up one set of motors, and retard the other set, in a manner hereinbefore described.

The airplane provided by this invention, although incorporating new designs and constructions, has controls which are not entirely unlike those the present day operators are accustomed to. Therefore, although my airplane provides new features of safety, stability, and maneuverability, its movements are controlled by manual operation similar to those operations now required of an operator, and pilots, trained to fly airplanes of the kind heretofore used, will need no further instructions in flying an airplane of my design.

From the foregoing it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. An airplane, comprising: a fuselage, so constructed and arranged as to be supported on and movable in water; and tail elevator means, for guiding movement of the airplane when in flight, comprising a pair of elevator surfaces pivotally connected to said fuselage on opposite sides of its longitudinal center, and movable independently of each other about axes at an angle to the longitudinal axis of said fuselage, said tail elevator means being so constructed and arranged that when said fuselage is in water, a selected one of said elevator surfaces or both of said elevator surfaces may be moved to engagement with the water, thus creating a drag on the movement of the airplane in the water so as to change the course of movement or retard movement of the airplane.

2. An airplane, comprising: a fuselage, so constructed and arranged as to be supported on and movable in water; tail elevator means, for guiding movement of the airplane when in flight, comprising a pair of elevator surfaces pivotally connected to said fuselage on opposite sides of its longitudinal center, and movable independently of each other about axes at an angle to the longitudinal axis of said fuselage, said tail elevator means being so constructed and arranged that when said fuselage is in water, a selected one of said elevator surfaces or both of said elevator surfaces may be moved to engagement with the water, thus creating a drag on the movement of the airplane in the water so as to change the course of movement or retard movement of the airplane; at least two propellers positioned at opposite sides of the longitudinal axis of said fuselage; motors for driving said propellers respectively; and means for selectively controlling the speed of said motor.

3. An airplane, comprising: a fuselage, so constructed and arranged as to be supported on and movable in water; tail elevator means, for guiding movement of the airplane when in flight, comprising a pair of elevator surfaces pivotally connected to said fuselage on opposite sides of its longitudinal center, and movable independently of each other about axes at an angle to the longitudinal axis of said fuselage, said tail elevator means being so constructed and arranged that when said fuselage is in water, a selected one of said elevator surfaces or both of said elevator surfaces may be moved to engagement with the water, thus creating a drag on the movement of the airplane in the water so as to change the course of movement or retard movement of the airplane; aileron members positioned at opposite sides of the longitudinal axis of said fuselage and carried for movement about respective axes generally transverse to said longitudinal axis; and means for selectively controlling the position of said ailerons about their axes.

4. An airplane, comprising: a fuselage, so constructed and arranged as to be supported on and movable in water; tail elevator means, for guiding movement of the airplane when in flight, comprising a pair of elevator surfaces pivotally connected to said fuselage on opposite sides of its longitudinal center, and movable independently of each other about axes at an angle to the longitudinal axis of said fuselage, said tail elevator means being so constructed and arranged that when said fuselage is in water, a selected one of said elevator surfaces or both of said elevator surfaces may be moved to engagement with the water, thus creating a drag on the movement of the airplane in the water so as to change the course of movement or retard movement of the airplane; at least two propellers positioned at opposite sides of the longitudinal axis of said fuselage; motors for driving said propellers respectively; means for selectively controlling the speed of said motors; aileron members positioned at opposite sides of the longitudinal axis of said fuselage and carried for movement about respective axes generally transverse to said longitudinal axis; and means for selectively controlling the position of said ailerons about their axes.

5. An airplane, comprising: a fuselage, so constructed and arranged as to be supported on and movable in water; tail elevator means, for guiding movement of the airplane when in flight, comprising a pair of elevator surfaces pivotally connected to said fuselage on opposite sides of its longitudinal center, and movable independently of each other about axes at an angle to the longitudinal axis of said fuselage, said tail elevator means being so constructed and arranged that when said fuselage is in water, a selected one of said elevator surfaces or both of said elevator surfaces may be moved to engagement with the water, thus creating a drag on the movement of the airplane in the water so as to change the course of movement or retard movement of the airplane; at least two propellers positioned at opposite sides of the longitudinal axis of said fuselage; motors for driving said propellers respectively; and means, for controlling said motors, so constructed and arranged that the speed of a selected one of said motors may be increased or decreased, or the speed of a selected one of said motors may be increased while the speed of the other motor is simultaneously decreased, or the speed of both of said motors may be simultaneously increased or decreased.

6. An airplane, comprising: a fuselage, so constructed and arranged as to be supported on and movable in water; tail elevator means, for guiding movement of the airplane when in flight, comprising a pair of elevator surfaces pivotally connected to said fuselage on opposite sides of its longitudinal center, and movable independently of each other about axes at an angle to the longitudinal axis of said fuselage, said tail elevator means being so constructed and arranged that when said fuselage is in water, a selected one of said elevator surfaces or both of said elevator surfaces may be moved to engagement with the water, thus creating a drag on the movement of the airplane in the water so as to change the course of movement or retard movement of the airplane; aileron members positioned at opposite sides of the longitudinal axis of said fuselage and carried for movement about respective axes generally transverse to said longitudinal axis; and means, for controlling said ailerons, so constructed and arranged that said ailerons may be simultaneously moved in the same selected direction about their axes, or may be moved in selected opposite directions about their axes.

7. An airplane, comprising: a fuselage, so constructed and arranged as to be supported on and movable in water; tail elevator means, for guiding movement of the airplane when in flight, comprising a pair of elevator surfaces pivotally connected to said fuselage on opposite sides of its longitudinal center, and movable independently of each other about axes at an angle to the longitudinal axis of said fuselage, said tail elevator means being so constructed and arranged that when said fuselage is in water, a selected one of said elevator surfaces or both of said elevator surfaces may be moved to engagement with the water, thus creating a drag on the movement of the airplane in the water so as to change the course of movement or retard movement of the airplane; at least two propellers positioned at opposite sides of the longitudinal axis of said fuselage; motors for driving said propellers respectively; means, for controlling said motors, so constructed and arranged that the speed of a selected one of said motors may be increased or decreased, or the speed of a selected one of said motors may be increased while the speed of the other motor is simultaneously decreased, or the speed of both of said motors may be simultaneously increased or decreased; aileron members positioned at opposite sides of the longitudinal axis of said fuselage and carried for movement about respective axes generally transverse to said longitudinal axis; and means for controlling said ailerons, so constructed and arranged that said ailerons may be simultaneously moved in the same selected direction about their axes, or may be moved in selected opposite directions about their axes.

HARRY A. DOUGLAS.